United States Patent [19]

Wine

[11] Patent Number: 5,025,745
[45] Date of Patent: Jun. 25, 1991

[54] BOAT HULL

[76] Inventor: David E. Wine, The Penthouse South, 2200 North Atlantic Ave., Daytona Beach, Fla. 32018

[21] Appl. No.: 377,270
[22] Filed: Jul. 10, 1989
[51] Int. Cl.⁵ .................. B63B 1/38; B63H 21/38
[52] U.S. Cl. ........................... 114/289; 440/89
[58] Field of Search ............... 440/89, 88, 37; 114/289, 67 A

[56] References Cited

U.S. PATENT DOCUMENTS

| | | | |
|---|---|---|---|
| 1,233,708 | 7/1917 | Ruhe | 114/289 |
| 1,307,135 | 6/1919 | Lake | 114/289 |
| 1,389,865 | 9/1921 | Fox | 114/289 |
| 1,412,848 | 4/1922 | Dunajeff | 114/289 |
| 1,792,031 | 2/1931 | Price | 440/37 |
| 1,831,697 | 11/1931 | Ziegler | 114/289 |
| 2,231,296 | 2/1941 | Sartori | 114/289 |
| 2,272,661 | 2/1942 | Finley | 114/290 |
| 2,842,084 | 7/1958 | Williams | 114/67 A |
| 3,316,874 | 5/1967 | Canazzi | 114/289 |
| 4,360,350 | 11/1982 | Grover | 440/88 |
| 4,407,215 | 10/1983 | Cyr | 114/289 |

FOREIGN PATENT DOCUMENTS

224515  4/1959  Australia .
844391  7/1981  U.S.S.R. .
996477  6/1965  United Kingdom .

Primary Examiner—David H. Brown
Attorney, Agent, or Firm—Venable, Baetjer and Howard

[57] ABSTRACT

A boat hull for an air thrust propeller driven boat is provided that includes a double hull construction along at least a portion of the length of the hull. The lower member of the double bottom portion of the hull is provided with a plurality of apertures. Air can be supplied to the hull apertures from two air sources, one of which is exhaust gas emitted from the exhaust manifolds of an internal combustion engine, and the other of which is air diverted from the slipstream of a propeller which is powered by the internal combustion engine. The air from the two air sources is channeled to the hull apertures, which direct the air against the water beneath the hull, thereby forming an air boundary layer beneath the boat to reduce friction between the underside of the boat and the underlying water. The hull further includes two heat exchanging tubes positioned on either side of the hull adjacent to the double hull portion that channel circulating cooling water from the exhaust manifolds to dissipate heat from the exhaust manifolds to the water beneath the hull.

35 Claims, 8 Drawing Sheets

BOAT HULL

CROSS-REFERENCED TO RELATED APPLICATION

Related subject matter is disclosed and claimed in U.S. patent application Ser. No. 357,017, entitled "Air Thrust Propulsion Boat - Drive Train", filed on May 25, 1989.

BACKGROUND OF THE INVENTION

1. Field of the Invention

The invention relates generally to boat hulls. More particularly, the invention relates to a boat hull for an air thrust propeller driven boat. The invention further relates to a boat hull for an air thrust propeller driven boat which upon reaching high speeds hydroplanes over the surface of the water.

2. Description of the Related Art

Air thrust propeller driven boats, or "air boats" as they are commonly known, have found wide range application and acceptance in areas where shallow water, reeds, everglades and subsurface debris present hazards to the operation of a submersed propeller. A significant advantage associated with air boats is their ability to hydroplane over the water's surface, and therefore, they require no significant water depth for effective operation.

An air boat operates generally on the principle that once high speeds are reached, the hull of the boat hydroplanes over the surface of the water, having relatively little impact on whatever lies beneath the surface of the water. Reaching the speeds necessary for hydroplaning, or "getting up on the plane", as it is generally termed in the vernacular, requires a significant amount of power depending upon the size of the boat.

Once an air boat reaches an appropriate speed, it will hydroplane. Once a boat begins to hydroplane, there is friction between the water surface and the bottom of the boat hull. Friction absorbs energy, thus reducing the speed and efficiency of the boat.

A number of boat hull designs have attempted to reduce the energy loss due to friction between the water surface and the bottom of a boat hull. One such attempt is disclosed in U.S. Pat. No. 2,842,084 to Williams wherein a boat hull is equipped with a series of channels open to the water surface. Air pumped into the channels lifts the boat, thus reducing water friction. A disadvantage of this design is that the bottom of the boat is not flat but rather has a series of projections forming the air filled channels. These projections are not desirable in air boat design.

In British patent application No. 996,477 filed Feb. 8, 1962 discloses an air thrust propeller driven boat having a second propeller. The second propeller produces a flow of air through a plenum chamber which extends through the mid-portion of the hull and discharges air beneath the boat, thus lifting the boat from the water surface. A disadvantage of this design is that a major portion of the boat loses utility due to the extreme size of the second propeller. Surface area is lost from the upper deck in order to incorporate the second propeller into the design of the boat. Further, this design makes direct use of the engine power and does not appear to enhance the efficiency of the engine which powers the propeller.

Typically, air boats are powered by an aircraft engine mounted high above the water line of the boat hull to provide adequate clearance for the rotating propeller. Aircraft engines used in air boats are generally expensive, heavy, extremely powerful, noisy and generally have poor fuel economy.

The use of a water-cooled engine in marine applications has a number of advantages over the use of an air-cooled engine. For example, a water-cooled engine is not as noisy as an air-cooled aircraft engine and generally has better fuel economy. However, a disadvantage associated with the use of water-cooled engines in marine applications, is that water-cooled engines require a circulating water cooling system. Typically, a circulating water cooling system in a boat draws water through an opening in the hull of the boat, circulates the water through the engine and expels it either out of the exhaust or out a rear portion of the hull. A cooling system such as this is generally called an "open loop" system.

Another type of cooling system called a "closed loop" circulating water cooling system, has a heat exchanging radiator for dissipating heat from the engine. Water circulated through the engine absorbs heat. The water is pumped to the radiator where the heat dissipates into the environment. The water then return to the engine and the cycle or "loop" repeats itself.

In boats where the engine is covered by a cowl or engine cover, marine codes require that exhaust manifolds on the engine be water cooled. Typically, exhaust manifolds in power boats are cooled by an "open loop" cooling system. However in an air boat, where the boat hydroplanes over the surface of the water, an "open loop" system is not practical, since there is no easy way to draw water into the system. Unfortunately, if a "closed loop" cooling system is used to cool both the exhaust manifolds of the engine and the engine itself, an extremely large radiator will be necessary in order to dissipate all the heat produced by both. Therefore, a single "closed loop" system used to cool both the exhaust manifolds and the engine is impractical.

SUMMARY OF THE INVENTION

In one embodiment of the invention, a boat hull for an air boat having hydroplaning capabilities is provided with means for reducing friction between the water and the bottom of the hull. The hull is further provided with a means for transferring heat from a power source within the boat to the water beneath the boat.

A portion of the bottom of the hull of the boat has a double hull construction. The double hull portion is constructed with upper and lower members which are spaced apart from one another. The double hull portion is formed with fore, aft and lengthwise disposed side pieces which define a chamber between the upper and lower members. A number of spacers are attached to the upper member of the double hull portion between the upper and lower members. The spacers are generally parallel to each other and run lengthwise from the bow to the stern of the boat within the chamber. The spacers define a number of channels within the chamber, the channels being between the spacers. The lower member is bolted to the spacers. The lower member of the hull has a plurality of apertures which provide fluid communication between the channels and the water beneath it.

In the preferred embodiment, a manifold is secured to the forward end of the upper member of the double hull portion. The upper member of the double hull portion and the manifold each have a plurality of apertures which provide fluid communication between the manifold and the chamber. There is a corresponding aperture in the manifold open to each channel within the chamber.

The manifold is divided into a plurality of subsections which are defined by partitions that are attached on the interior of the manifold. Preferably, the manifold is divided into four manifold sections. One such partition is centrally located in the manifold and the other two partitions are located on either side of the central partition. The manifold is thus preferably subdivided into four approximately equal subsections. Each subsection of the manifold has its own corresponding inlet aperture. Each channel is in fluid communication with only one subsection of the manifold, each subsection of the manifold defines a subsection of channels with the chamber, and each subsection of the manifold is in fluid communication with a corresponding subsection of channels within the chamber.

For the sake of example only, the four sections of the manifold are hereinafter referred to in pairs, but as one skilled in the art should recognize, the invention is not solely limited to this arrangement. The two innermost manifold subsections are hereinafter referred to as the inner manifolds and the two outermost manifold subsections are hereinafter referred to as the outer manifolds.

The boat is powered by an internal combustion engine having two exhaust manifolds, one exhaust manifold on each side of the engine. Exhaust gas from each exhaust manifold is directed into the inner manifold by a pair of exhaust pipes. The exhaust gas passes through the inner subsections of the manifold into the corresponding channels within the chamber. The plurality of apertures in the lower member of the double hull portion allows the exhaust gas to escape against the water, creating a boundary layer of gas between the water and the hull, thus providing lift to the boat and reducing friction between the water and the bottom of the boat.

The internal combustion engine powers a propeller which rotates in a generally vertical plane. The propeller is supported by a structure which is mounted to the rear portion of the hull of the boat. The propeller support structure includes a trapezoidal frame which is mounted directly to the hull of the boat. The trapezoidal structure is a sealed structure which is open at its upper end to the hollow interior of a support post. The support post is bolted to the top of the trapezoidal structure. A hollow housing is attached to the upper end of the support post. The housing rotates about a generally vertical axis that extends approximately through the center of the hollow support post. There are a plurality of hollow spokes attached to and radially disposed about the rotatable housing. Preferably, there are five hollow spokes. The propeller is encircled by a shroud. The shroud is attached to each of the hollow spokes. The shroud is formed of two concentric cylindrical sections which form a recess therebetween.

On the aft end of the shroud, there is a curved shape radial lip which captures a small portion of the air pressure or slipstream air produced by the rotation of the propeller. The recess formed between the two shroud sections, the hollow spokes, the housing, the hollow interior of the support post, and the interior of the trapezoidal structure form a conduit through which pressurized air travels.

When the internal combustion engine engages the propeller to produce forward thrust, the radial lip on the aft end of the propeller shroud captures a portion of slipstream air. The slipstream air captured by the curved lip is channeled into the recess formed between the two shroud sections. The air travels from the recess into the hollow spokes, through the housing and into the hollow support post. From the hollow support post, air travels into the trapezoidal shaped structure. A pair of conduits in fluid communication with the interior of the trapezoidal structure, direct air to the outer manifolds of the double hull portion. The outer manifolds further direct the air into the outer channels in the chamber of the double hull portion and through the plurality of apertures in the lower member, where the air escapes against the water, creating a boundary layer of air between the water and the hull, thus further providing lift for the boat and reducing friction.

The engine, has a closed loop cooling system which includes a radiator mounted to a mid-portion of the engine cover. The engine further includes a water pump. Water circulates through the engine, and is circulated by the pump. Water is then pumped through the radiator where heat is dissipated, and the water then returns to the engine where it absorbs heat. The engine further includes a second water pump which circulates cooling water through the exhaust manifolds. The exhaust manifolds are marine exhaust manifolds and each has a water inlet and water outlet for water circulation cooling.

The hull of the boat further includes two heat exchanging tubes formed on each side of the hull adjacent to the double hull portion of the boat, but on a portion of the hull which is in contact with water during motion of the boat. Preferably, each heat exchanging tube runs generally parallel to a forward and aft center line of the hull.

There are two exhaust manifolds on the engine and two heat exchanging tubes, one on either side of the engine and hull, respectively, with both sides being generally symmetrical. Each of the two exhaust manifolds and tubes coact in the following fashion as a "closed loop" cooling system.

The second water pump on the engine pumps water to the exhaust manifold where heat is absorbed by the water. A conduit then carries the water from the exhaust manifold preferably to the rear or aft end of the heat exchanging tube. The cooling water then travels through the tube where heat is dissipated through the hull to the water beneath the hull. At the fore end of the tube there is a second conduit which directs the cooling water back to the second water pump on the engine where it is pumped again back into the exhaust manifold repeating the "loop".

BRIEF DESCRIPTION OF THE DRAWINGS

The several features of the present invention will be more clearly understood from the following detailed description when read in conjunction with the accompanying drawings, in which.

DETAILED DESCRIPTION OF THE PREFERRED EMBODIMENT

Figure 1:
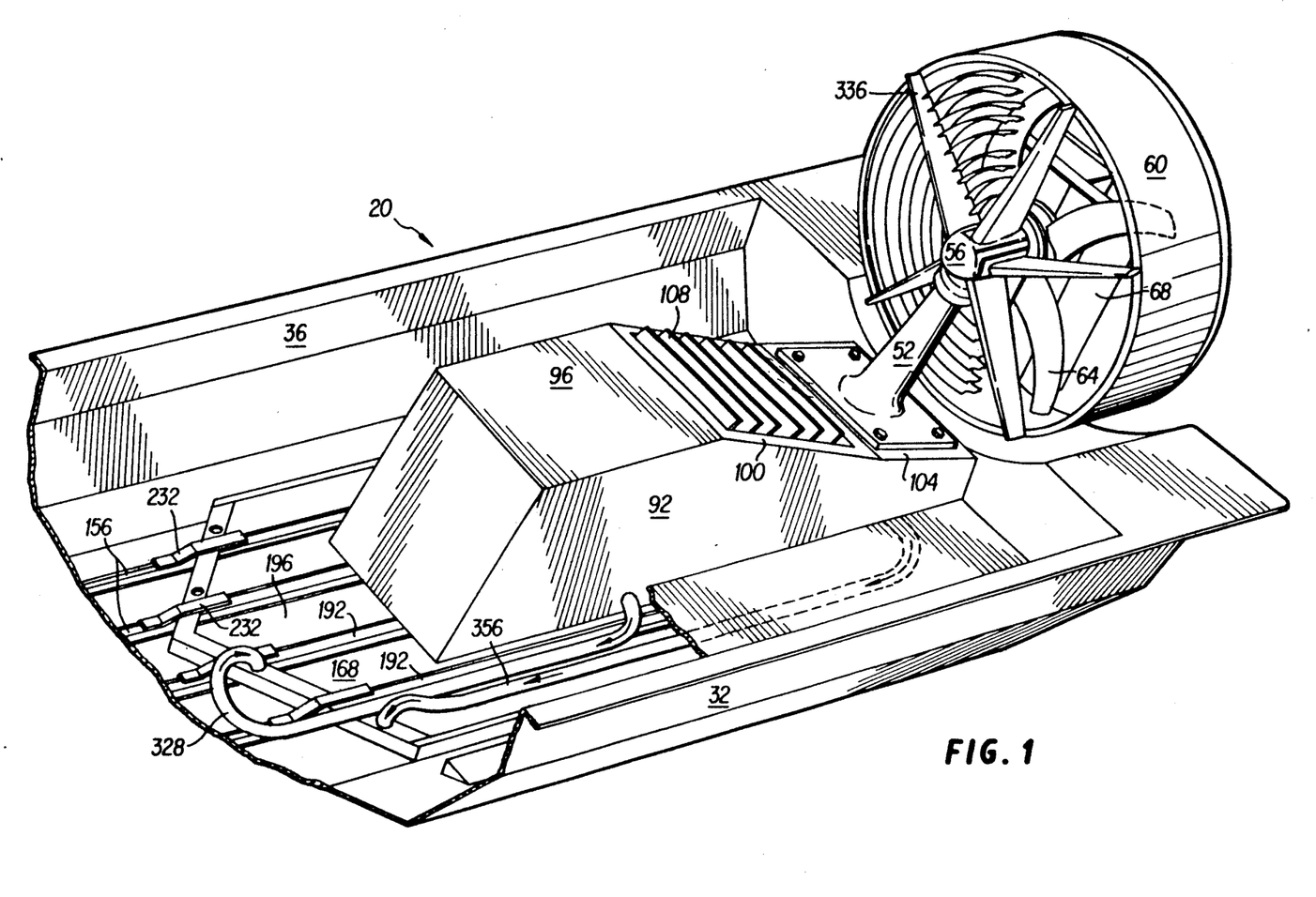
FIG. 1 is a fragmentary perspective view of the aft end of an air thrust boat constructed in accordance with one embodiment of the present invention.
Figure 2:
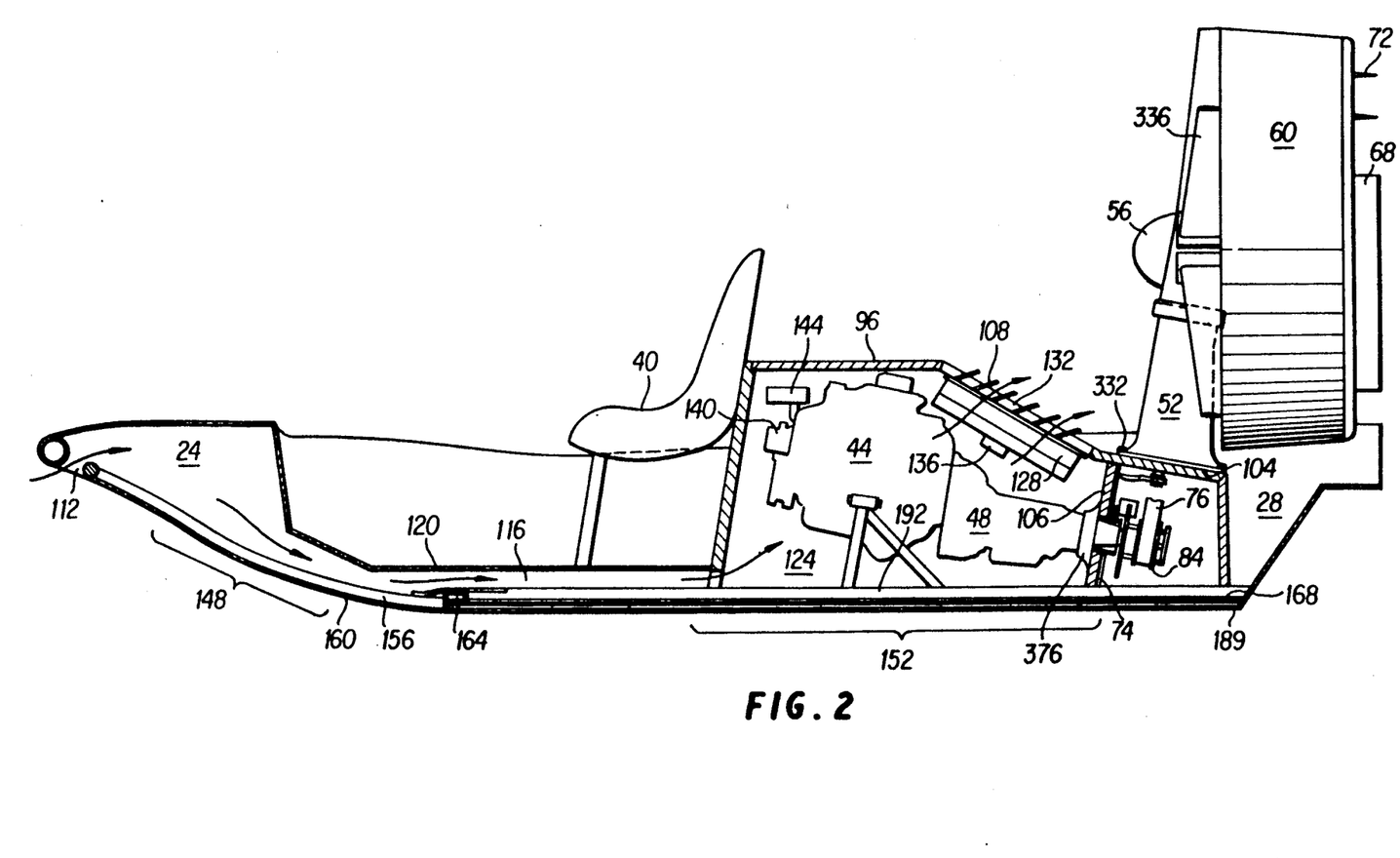
FIG. 2 is a side elevation, on a reduced scale of the air thrust boat, including in phantom detail the engine compartment.

Referring in detail to the drawings by numerals of reference, wherein like numerals represent like components throughout the drawing figures, and with particular reference to FIGS. 1 and 2, the hull of an air thrust propeller driven boat representing one embodiment of the present invention is depicted and designated generally by the reference numeral 20.

The hull 20 has a bow region 24 and a stern region 28, a port side 32 and starboard side 36 and an operator's chair 40 that is preferably mounted slightly forward of midships. The drive train is preferably like that further describe in a copending application entitled "Air Thrust Propeller Driven Boat—Drive Train" Ser. No. 357,017 filed on May 25, 1989 (WIN-89001), which is incorporated herein by reference. The copending "Drive Train" application includes a detailed description of the engine 44, transmission 48, support post 52, housing 56, propeller 64, rudders 68, air foils 72, and trapezoidal support structure 74.

In brief, the copending application discloses the power train which includes the engine 44. Power from the engine 44 is transmitted through the transmission 8. The power transmitted through the transmission 48 is further transmitted to an endless belt 76 (FIGS. 2 and 8) which extends through the hollow interior 80 of the support post 52. The belt 76 is trained around the pulley 84 which is mounted to the rear of the transmission 48 and a second pulley (not shown) which is disposed in the housing 56. The transmitted power from the engine 44 is used to rotate a propeller 64 which produces thrust.

An engine cover 92 conceals the engine 44 and transmission 48. The engine cover 92 has a fore section 96, a mid-section 100 and an aft section 104. The mid-section 100 of the engine cover is fitted with louvres 108.

Referring now to FIG. 2 an air inlet 112 on the underside of the foremost section of bow 24 channels air through a tunnel 116 beneath the deck 120 into the engine compartment 124. The air is then channeled through a radiator 128 which dissipates heat from the engine 44. The air is drawn out from the louvre openings 132 where it may escape into the environment. The louvres 108 are positioned such that when the hull 20 has forward motion, the propeller 64 draws air from the engine compartment 124 through the louvre openings 132.

A fan 136 bolted to the radiator is typically thermostatically controlled and will circulate air through the radiator when necessary. The fan 136 also serves to clear the bilge prior to engine 44 start-up, as required by marine code.

The engine 44 includes a first water pump 140 which circulates water through the engine 44 to the radiator 128 through a set of hoses (not shown). The engine further includes a second water pump 144 which will be presently described.

As shown in FIG. 2, the hull has two main structural segments, a bow hull portion 148 and a double hull portion 152 hereinafter referred to as the double hull 152. The bow portion 148 of the hull 20 has a reinforced hull structure which includes bow stringers 156 which are welded to a metallic sheet hull piece 160. Slightly forward of midships is a manifold 164. The manifold 164 is attached to an upper member 168 of the double hull 152 of the hull 20. The double hull 152 of the hull 20 extends from the manifold 164 to the stern 28 of the hull 20.

Figure 3:
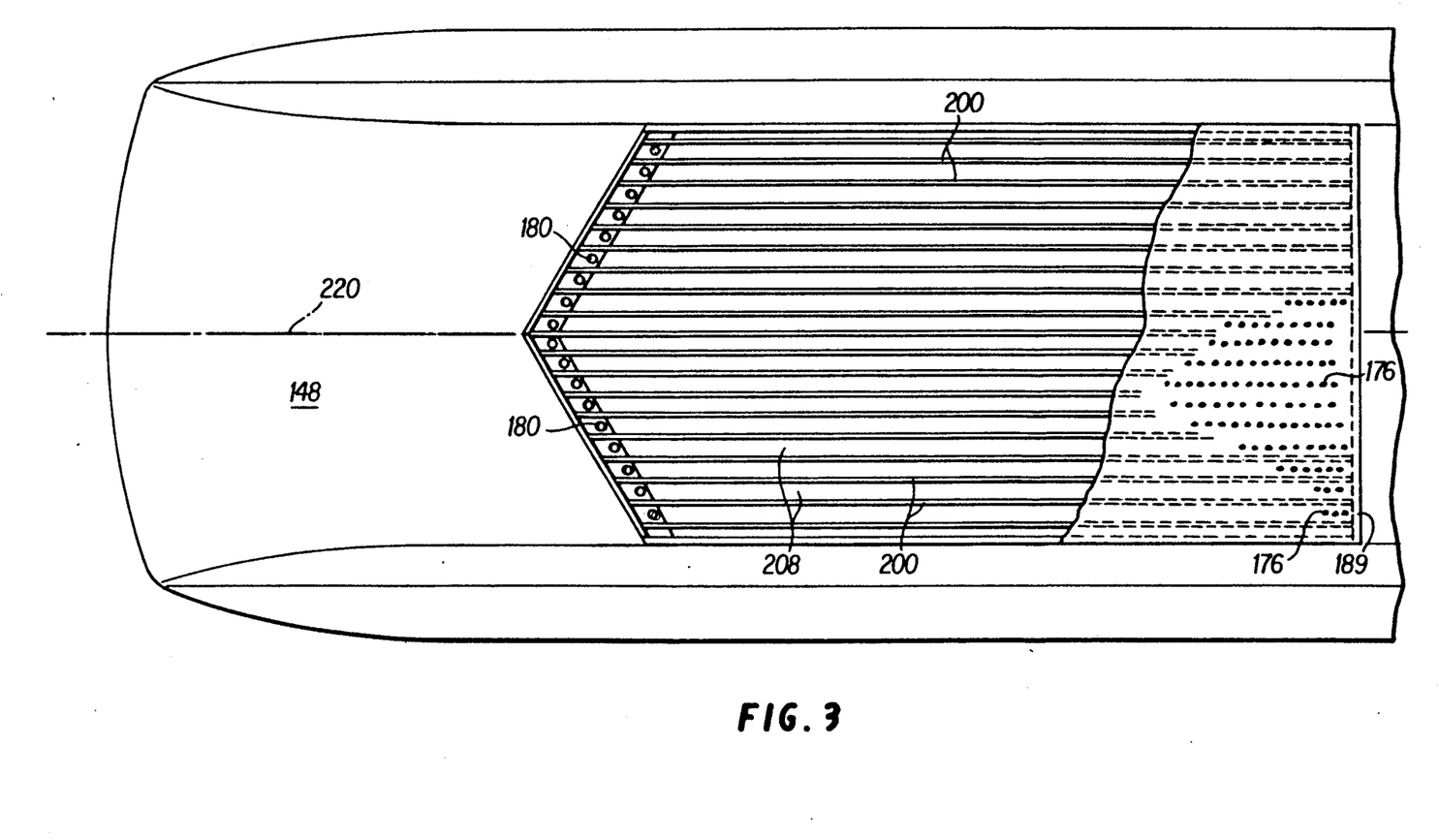
FIG. 3 is a fragmentary bottom plan view of the hull of the air boat, on the same scale as FIG. 2, depicting the double bottom portion of the hull.
Figure 4:
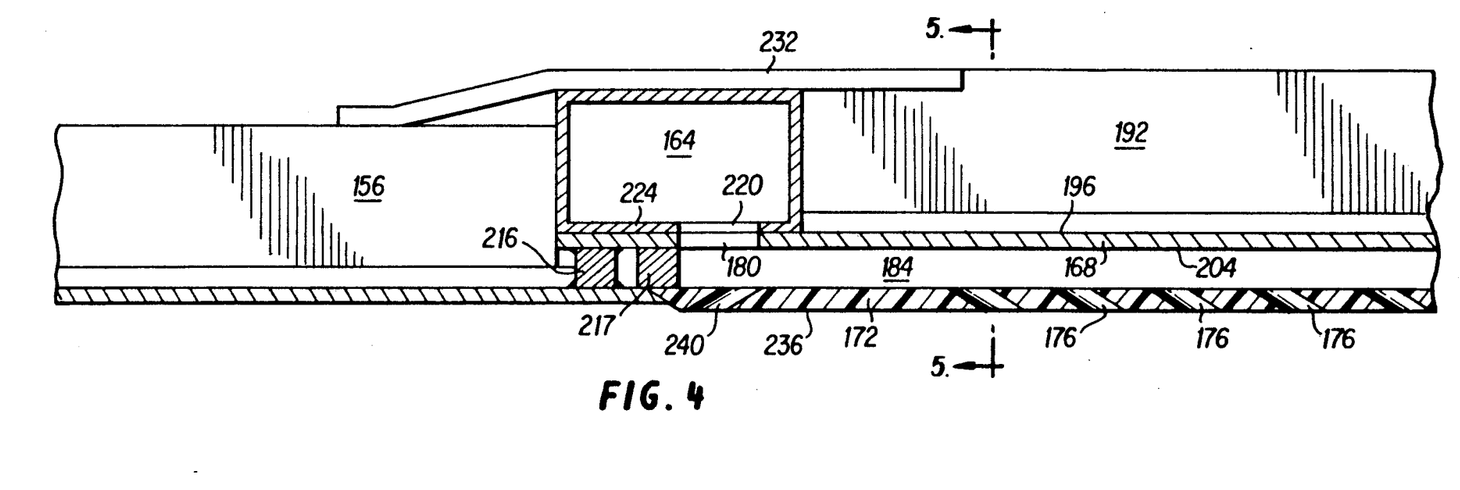
FIG. 4 is a fragmentary side view on an enlarge scale of the double bottom portion of the hull and the manifold.
Figure 5:
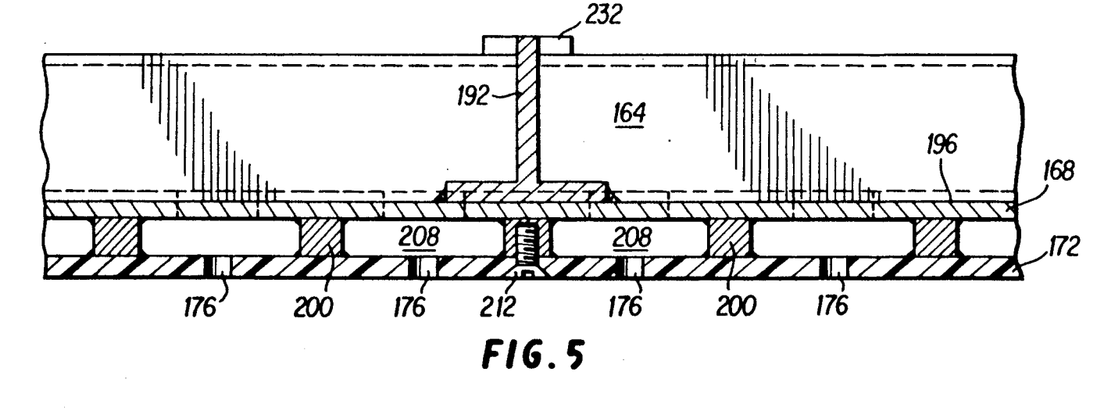
FIG. 5 is a sectional view on the same scale as FIG. 4 taken at long the line 5—5 of FIG. 4.

Referring now to FIGS. 3, 4 and 5, the double hull 152 of the hull 20 has an lower member 172 which has a plurality of apertures 176. The upper member 168 of the double hull 152 has a plurality of manifold apertures 180 open to the manifold 164. A chamber 184 is formed between the upper member 168 of the double hull 152 and the lower member 172. The upper member 168 is welded to two side portions 188 (FIG. 7) which run lengthwise on each side of the double hull 152. An aft cross piece 189 (FIGS. 2 and 3) is also welded to the upper member 168 and further defines the chamber 184.

The forward stringers 156 run from the bow 24 to the manifold 164. The bow stringers 156 have a somewhat curved shape and are welded to the hull sheet piece 160 of the hull 20. A plurality of aft stringers 192 run from the manifold 164 to the stern 28 in a generally parallel manner. The double hull 152 is reinforced by the stringers 192 which are welded to the upper surface 196 of the upper member 168.

A plurality of spacer elements 200 are attached lengthwise from the manifold 164 to stern 28 in a generally parallel fashion to the lower surface 204 of upper member 168 of the double hull 152. The spacer elements 200 define a plurality of channels 208 formed in the chamber 184 of the double hull 152. The lower member 172 of the double hull 152 can be made from a polymer material such as Ultra High Molecular Weight (UHMW) polyethylene material manufactured by Westlake and is secured to the spacers 200 and to the side portions 188 (FIG. 7) by screws 212 (FIG. 5).

The front most section of the double hull 152 of the hull 20 is reinforced by two rods 216 and 217, (FIG. 4). The rods 216 and 217 are welded to the hull sheet piece 160 and the bow stringers 156. Each rod 216 and 217 is welded at an angle measured from a center line 220 which runs down the center of the hull 20 from the bow 24 to stern 28 thereof. The rods 216 and 217 being angled in this manner, form a V-shape. The manifold 164, and the double hull 152 as a consequence, have a corresponding V-shape as depicted in FIG. 3.

The manifold 164 is welded to the reinforcing rods 216 and 217 and to the upper surface 196 of the upper member 168 of the double hull 152 of the hull 20. The lower side 224 of the manifold 164 has a plurality of apertures 220, which correspond to manifold apertures 180 in upper member 168. Each aperture 220 and manifold aperture 180 permit fluid communication between the manifold 164 and a corresponding channel 208 defined by the spacers 200.

A set of reinforcing bars 232 (FIG. 4) are welded to the aft stringers 192, to the forward stringers 156 and to the top of the manifold 164.

The lower member 172 of the double hull 152 has a plurality of apertures 176 (FIGS. 3, 4 and 5). The apertures 176 extend throughout the lower member 172 of the double hull 152 and are inclined from the chamber 184 to the underside 236 of the hull 20 toward the stern 28 of the hull 20. There are from about 20 to 80 of the apertures 176 in each channel 208 defined by the spacers 200. In the front most portion of the lower member 172 of the hull 20 there are cooling apertures 240, at least one for each channel 208 defined by the spacers 200. Each cooling aperture 240 is inclined from the chamber 184 to the underside 236 of the hull 20 toward the bow 24 of the hull 20. The angle of inclination of the apertures 176 is from about 30° to 60° but is preferably approximately 45° measured from the horizontal and the stern of the hull 20. The cooling apertures 240 are also angle from between 30° to 60° but preferably approximately 45°.

Figure 6:
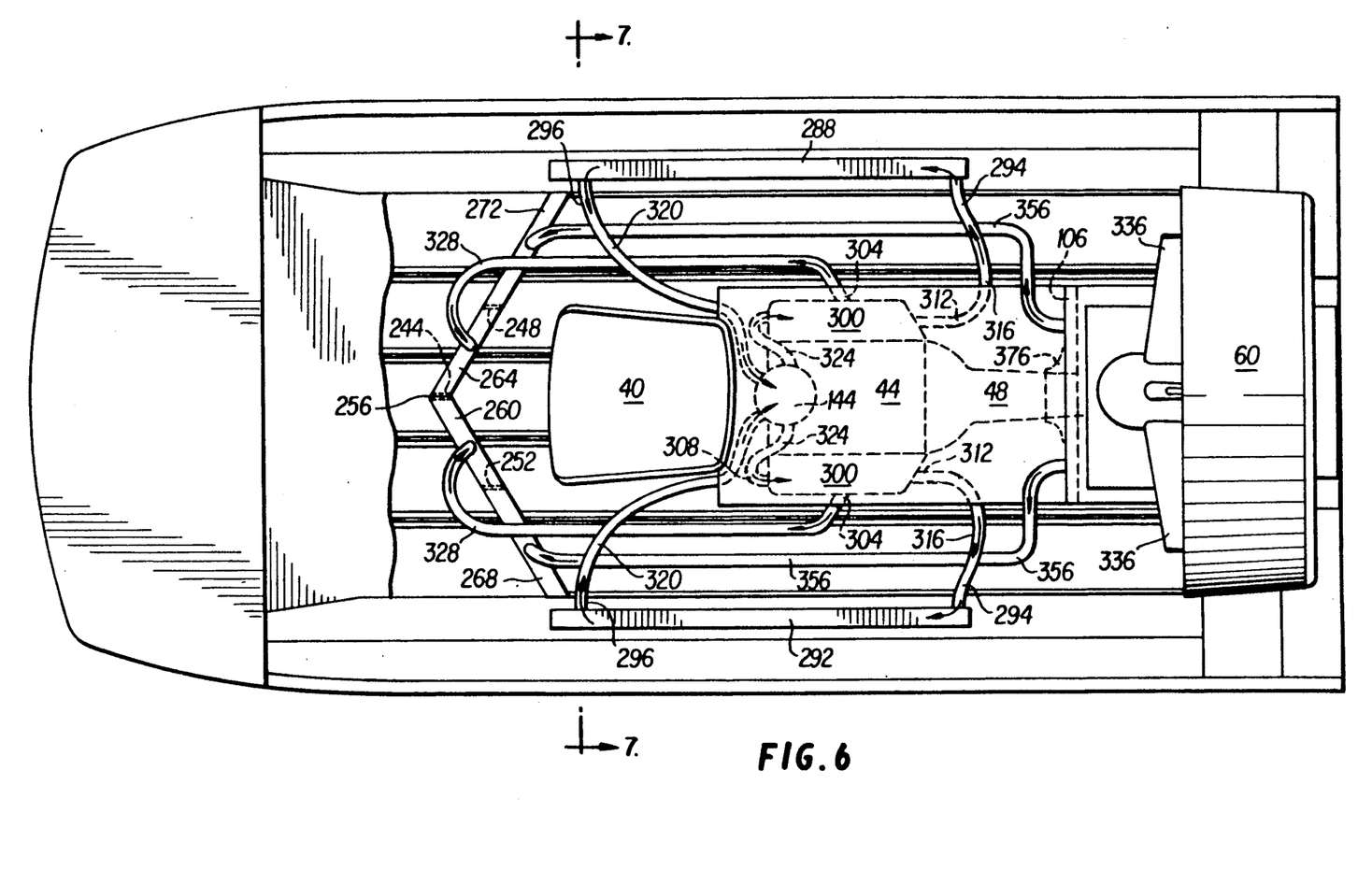
FIG. 6 is a fragmentary top plan view of the air boat, depicting the circulating water system and the exhaust air flow systems.

The manifold 164 is partitioned into four subsections by partitions 244, 248, and 252 (FIG. 6). The partition 244 is centrally located at the apex 256 of the V-shape of the manifold 164. The remaining partitions 248 and 252 are symmetrically positioned on either side of the apex 256 of the V-shaped manifold 164 and within the interior of the manifold 164. The partitions are preferably welded in position.

The subsections of the manifold 164 define subsections of the double hull 152 because each channel 208 is in fluid communication with only one subsection of the manifold 164. The subsections of the manifold 164 will hereinafter be referred to in pairs, such that the center most pair of subsections will be referred to as the inner manifolds 260 and 264. The two outer most subsection of the manifold 164 will be referred to as the outer manifolds 268 and 272.

Figure 7:
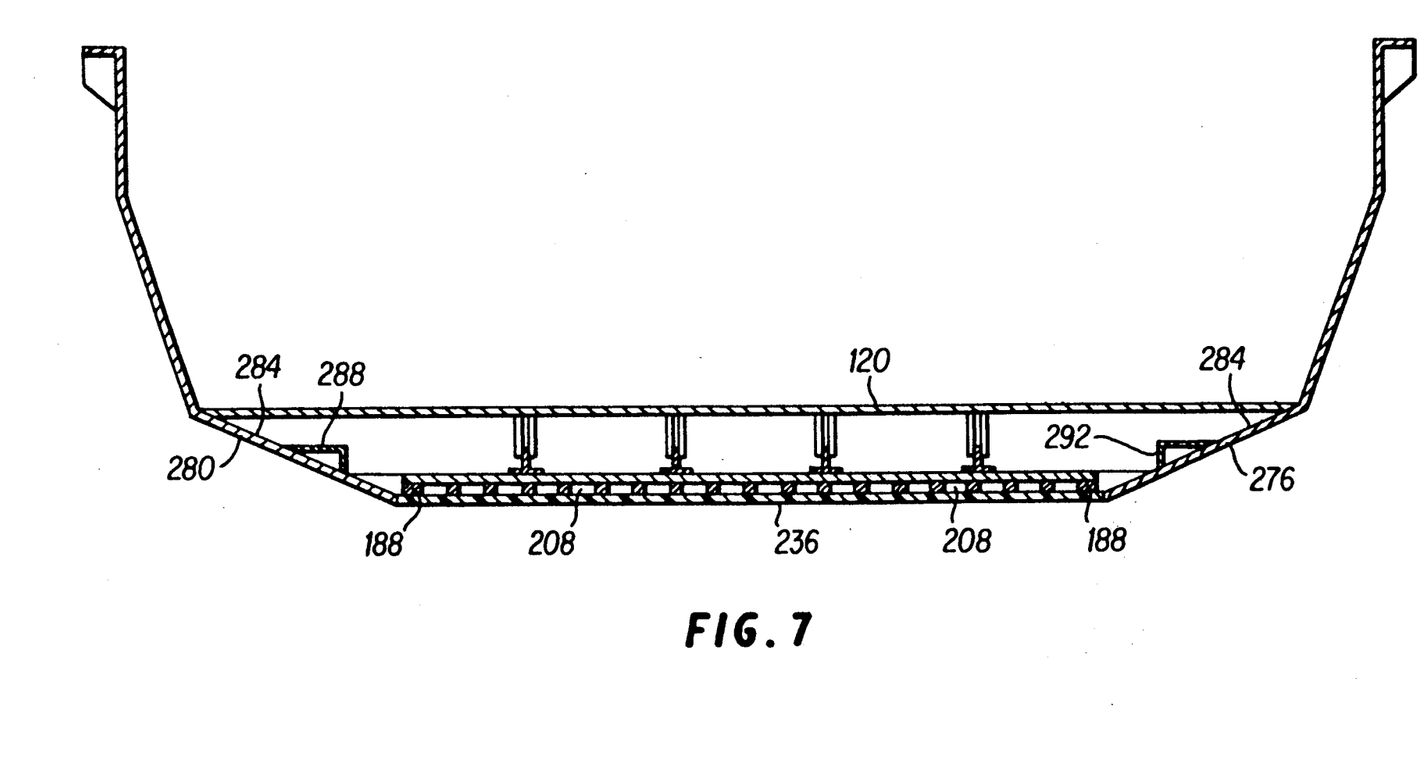
FIG. 7 is a sectional view of the hull of the boat taken along the lines 7—7 of FIG. 6.

Referring now to FIGS. 6 and 7, adjacent either side of the double hull 152 of the hull 20 are two welded flat lateral pieces 276 and 280 which are welded to side portions 188. On the inner surface 284 of each of the two lateral pieces 276 and 280 are triangular shaped tubes 288 and 292 shown in both FIGS. 6 and 7. These tubes 288 and 292 are formed from elongated metallic strips which are welded to the lateral pieces 276 and 280 of the hull 20. Each tube 288 and 292 has a tube inlet 294 and an tube outlet 296.

Referring specifically now to FIG. 6, the engine 44 is shown with the exhaust manifolds 300 (in phantom). Each exhaust manifold 300 is preferably a standard marine manifold and has exhaust gas outlet 304. The following discussion will be addressed to one exhaust manifold 300 and one tube 288. However, the two exhaust manifolds 300 are symmetrical and the two tubes 288 and 292 are symmetrical. The function of one exhaust manifold 300 and one tube 288 working together is essentially identical with the manifold and tube on the opposite side of the hull 20.

The exhaust manifold 300 has a water inlet 308 and a water outlet 312. Water circulated through the second water pump 144 is pumped through the exhaust manifold 300 and out of water outlet 312 to a first conduit 316 which is connected to the tube 288. The first conduit 316 is attached to the tube inlet 294 of the side tube 288. Water circulating through the side tube 288 exchanges heat with the water beneath the hull 20. Water from the tube 288 is drawn into a second conduit 320 which is connected to the tube outlet 296 of the tube 288 and to the second water pump 144. Water then travels to the second water pump 144 where it is circulated back to the exhaust manifold 300 through a third conduit 324.

Exhaust gas from each exhaust manifold 300 is channelled through the exhaust pipe 328 to the inner manifolds 260 and 264. The inner manifolds 260 and 264 then channel the exhaust gas through the apertures 220 and 180 into the channels 208 formed within the double hull 152. The apertures 176 in the lower member 172 of the double hull 152 of the hull 20 then allow exhaust gas to escape into the environment.

Figure 8:
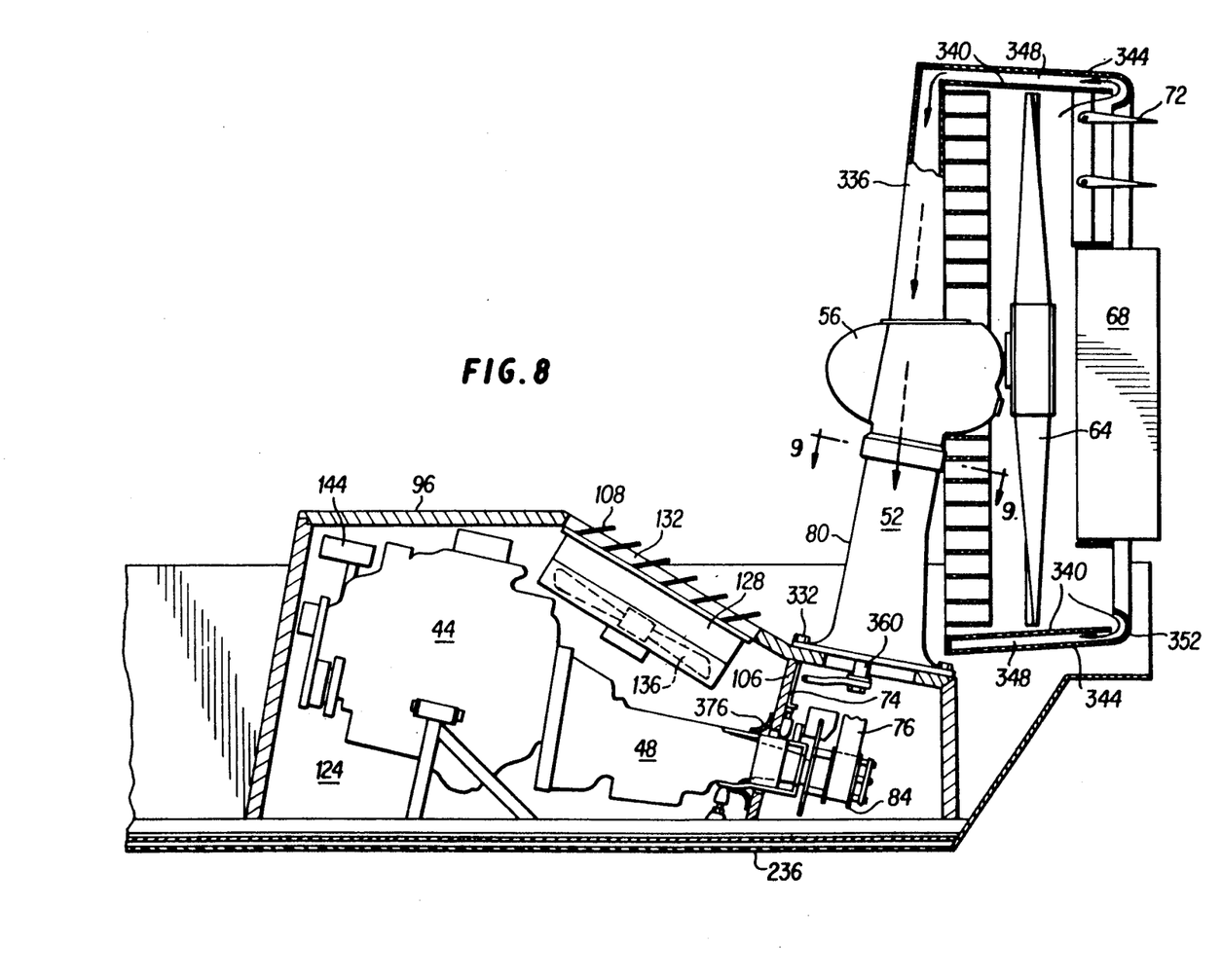
FIG. 8 is a fragmentary part section in a vertical plane passing through the center line of the boat, on an enlarge scale, of the aft end of the hull, showing the engine compartment, the support member, the housing, the shroud, and the steering mechanisms.

Referring now to FIGS. 2 and 8, a hollow cylindrically-shaped support post 52 is secured to the aft portion 104 of the engine cover 92 by bolts 332. The aft portion 104 of the engine cover 92 is supported by a trapezoidal frame 74 which is further described in the copending "Drive Train" application referred to hereinabove and incorporated herein by reference. The aft end 104 of the engine cover 92 defines a pressurized chamber which is enclosed on its forward most side by the plate 106. The transmission 48 extends into this pressurized chamber through a hole in the plate 106 but is sealed around its perimeter by a rubber-like boot 376.

The boot 376 encircles the rear portion of the transmission 48. The rear portion 104 of the engine cover 92 is open to the hollow interior of the support post 52, but is sealed on the rear, bottom and sides.

The housing 56 is rotatably attached to the support member 52. A plurality of hollow spokes 336 are secured to the housing 56. A shroud 60 is welded to the spokes 36. The shroud 60 encircles the propeller 64. The shroud 60 is composed of an inner section 340 and outer section 344. A recess 348 is formed between the inner and outer sections 340 and 344 of the shroud 60. The shroud 60 has a tapered cross-section such that the inner section 340 and the outer section 344 have a diameter on the forward end which is larger than the diameter on their aft end as is indicated in FIG. 8.

The outer section 344 of the shroud 60 is fitted with a ring shaped curved lip 352 which completely encircles the rear portion of the shroud 60. The curved lip 352 captures a small portion of the air flow produced by the propeller 64. The curved lip 352 directs the air through the recess 348 of the shroud 60 into the hollow support spokes 336, through the housing 56 and support post 52 to a pair of air conduits 356.

Figure 9:
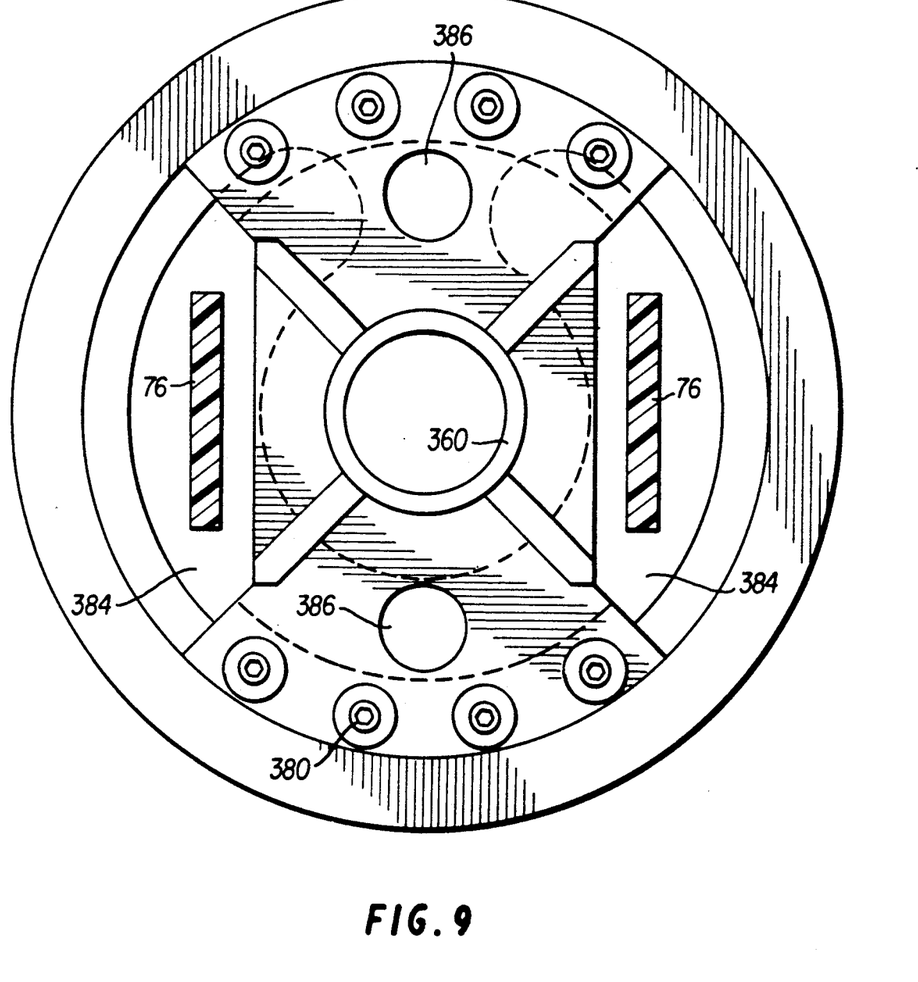
FIG. 9 is a top view of the upper portion of the support post and the bottom of the housing taken along the lines 9—9 of FIG. 8.

Referring now to FIGS. 6, 8 and 9, the conduits 356 are connected to a plate 106 that is attached to the front of the support structure 74. The conduits 356 direct air to the outer manifolds 268 and 272. The outer manifolds 268 and 272 then direct the air through the apertures 220 and 180 to the channels 208 in the chamber 184 defined by the spacers 200 in the double hull 152. The apertures 176 in the lower member 172 of the double hull 152 then allow the air to escape to the environment.

A hollow steering shaft 360 extends through the support member 52, and is further described in the copending "Drive Train" application. The steering shaft 360 is attached at its upper end to a plate 372. The plate 372 is attached to the underside of the housing 56 by screws 380. The plate 372 has two one-inch diameter holes 386. Air that has been captured by the radial lip 352 travels through the recess 348 within the shroud 60 and into the hollow spokes 336. The hollow spokes 336 are open to the interior of the housing 56 such that air can travel from within the hollow spokes 336 to the interior of the housing 56. Air then travels from within the housing 56 around the plate 376 through gaps 384 and holes 386. The endless belt 76 also travels through the openings 384 on either side of the plate 372. Air is also able to travel through the hollow interior of the shaft 360 down through the hollow interior of the post 52 and into the underside of the aft deck portion 104 of the engine cover 92.

The conduits 356 are connected to the plate 106 on either side of the transmission adjacent to the boot 376 (FIG. 6) in this fashion, air diverted from the radial lips 352 is able to travel through the shroud 60, the spokes 336, the housing 56, the support post 52, the aft section 104 of the engine cover 92 further through a conduits 356 and into the outer manifolds 268 and 272.

Operation of Boat

To put the boat in motion, an operator of the boat 20 seated in operator's chair 40 increases the throttle to the engine 44 to produce air thrust from the propeller 64. Once the boat 20 has achieved a high rate of speed, the boat will begin to hydroplane over the surface of the water. Once the boat has begun to hydroplane, the features of the invention become most apparent. When the boat is hydroplaning, as discussed earlier, there is a certain degree of friction created between the water and the bottom or underside of the boat. Exhaust gas channeled from the engine's exhaust manifolds to the double hull 152 of the boat 20, exits through the plurality of apertures 176 in the lower member 172 of the double hull 152 creating a boundary layer of air between the water and the underside 236 of the boat. Tests which have been performed demonstrate that the boundary layer of air increases the efficiency of the boat by reducing friction between the water and the underside of the boat. Further, the efficiency of the engine is also increased. The angle of inclination of the plurality of apertures 176 in the lower member 172 of the double hull 152, causes a venturi effect to be created when the boat is hydroplaning. As the boat moves over the surface of the water, exhaust gas is drawn out from the plurality of apertures 176 in the lower member 172 of the double hull 152. Measurements demonstrate that while the boat is hydroplaning a measurable vacuum or pressure drop is created beneath the boat, drawing the exhaust gas out of the chamber 184 and hence from the exhaust manifolds 300. The pressure drop reduces the pressure in the exhaust manifolds 300 and increase the efficiency of the engine 44.

Further, the slipstream air captured by the curved lip 352 on the slipstream side of the propeller shroud 60 captures air and channels it down through the recess 348 in the shroud 60, the hollow spokes 336, the housing 56 and the support post 52 through the conduits 356 to the outer manifolds 268 and 272 and the chamber 184 of the double hull 152. The slipstream air directed through the double hull 152 and out the plurality of apertures 176 further develops the boundary layer created by the exhaust gases exiting through the inner manifolds 268 and 272 of the double hull 152. Hence, the combination of both exhaust gases and slipstream air diverted to the underside 236 of the boat 20 by the system of the present invention, reduces the friction between the underside of the boat and the water beneath it, and due to the venturi effect also increases the efficiency of the internal combustion engine which powers the boat.

The performance and effectiveness of the radial lip 352 and the efficiency of the propeller within the shroud 60 is increased due to the shrouds 60 converging nozzle design. The inlet side of the shroud 60 is larger than the exhaust or aft side of the shroud 60, and may be thought of as a converging nozzle. The velocity of air exiting the aft side of the shroud 60 is greater than the velocity from a shroud which has an inlet diameter equal to the outlet diameter. The tapered design of the shroud 60 also further increases the air capturing characteristics of the radial lip 352, due to the converging nozzle shape of the shroud 60.

It was observed that the portion of the double hull in contact with the exhaust gases from the exhaust manifolds 300 reached rather high temperatures when the boat was hydroplaning. The introduction of the secondary apertures 240 in the lower member 168 of the double hull 152, angled toward the bow of the boat, allow water and air to enter the channels 208 within the chamber 184. The water and air absorb heat within the chamber 184 reducing the temperature of the double hull 152 significantly without noticeably reducing the benefits of the boundary layer and the venturi effect.

Water inevitably splashes up on the underside 236 of the boat 20 and in particular on the lateral pieces 276 and 280 of the boat 20. The heat exchanging tubes 288 and 292 on either side of the boat take advantage of the water which contacts the lateral pieces 276 and 280. Water circulated through the exhaust manifolds and through the tubes 288 and 290 transfers a significant amount of heat to the water which contacts the lateral pieces 276 and 280 of the boat 20.

The present invention provides a more inherently efficient air boat which when hydroplaning can travel effectively with a reduction in friction between the underside of the boat and the water surface. The present invention also provides an air boat with an energy efficient hull which will increase engine efficiency due to the vacuum created on the underside of the hull. The present invention also provides a more efficient method for eliminating heat from the exhaust manifolds of the internal combustion engine by providing a portion of the hull which serves in heat exchange relationship with the water beneath the boat.

What is claimed is:

1. A boat comprising:
   a hull;
   an internal combustion engine mounted to said hull, said internal combustion engine having at least one exhaust manifold;
   a propeller rotatably coupled to an upper and rearward portion of said hull and powered by said internal combustion engine, said propeller being rotatable in a generally vertical plane;
   a propeller shroud coupled to said hull, said shroud generally encircling said propeller and having means for capturing slipstream air from said propeller;
   means for expelling exhaust gases from said exhaust manifold and slipstream air from said shroud along the lower surface of said hull, and against the water beneath the hull.

2. The boat as set forth in claim 1, wherein said propeller shroud has a fore end with a diameter larger than the diameter of the aft end of said shroud.

3. The boat as set forth in claim 1, wherein said means for expelling said exhaust gases comprises:

upper and lower hull members that are spaced apart from each other, means for uniting said hull members at their fore and aft ends and along their lengthwise sides, to form a double hull, defining a chamber there between;

said lower hull member being formed with a plurality of apertures that provide communication between said chamber and the lower face of said lower hull member; and means for supplying exhaust gas from said exhaust manifold and slipstream air from said shroud to said chamber.

4. The boat as set forth in claim 3, further comprising means for cooling said chamber.

5. The boat as set forth in claim 3, further comprising:
a plurality of lengthwise-extending spacer elements disposed between said upper and lower hull members said spacer elements defining a plurality of channels within said chamber; and
said means for supplying gases to said chamber comprising at least one means for supplying gases to each of said channels.

6. The boat as set forth in claim 5, wherein means for supplying gases further comprises means for delivering gases to each of said channels.

7. The boat as set forth in claim 3, further comprising heat transferring means comprising a part of the hull remote from the upper and lower hull members that provide a broad lengthwise-extending surface that is disposed to be in contact with water during motion of the boat.

8. The boat as set forth in claim 7, wherein said heat transferring means further comprises:
at least one tube connected in a heat exchanging relationship to said lengthwise-extending surface, said tube having a fluid inlet and a fluid outlet; and
a circulating water system, said circulating water system being in fluid communication with said exhaust manifold, and absorbing heat therefrom, and said circulating water system being in fluid communication with said tube.

9. The boat as set forth in claim 3, wherein said apertures are inclined to the vertical from said chamber toward an aft end of the hull.

10. The boat as set forth in claim 9, wherein said apertures are inclined at an angle from about 30 degrees to about 60 degrees.

11. The boat as set forth in claim 9, wherein said apertures are inclined an angle of about 45 degrees.

12. The boat as set forth in claim 3, further comprising cooling means having at least one cooling aperture formed in said lower member providing communication between said chamber and the lower face of said lower hull member, wherein each cooling aperture is inclined to the vertical from the chamber to the bottom of said lower hull member toward the bow of the hull.

13. The boat as set forth in claim 12, wherein each cooling aperture is inclined at an angle from about 30 degrees to about 60 degrees.

14. The boat as set forth in claim 12, wherein each cooling aperture is inclined at angle of about 45 degrees.

15. A boat comprising:
a hull;
an internal combustion engine coupled to said hull, said internal combustion engine having at least one exhaust manifold;
a propeller rotatably coupled to an upper side of said hull and powered by said internal combustion engine;
upper and lower hull members that are spaced apart from each other, means being provided for uniting said hull members at their fore and aft ends and along their lengthwise sides to form a double hull defining a chamber therebetween, said lower hull member being formed with a plurality of apertures that provide communication between said chamber and the lower face of said lower hull member;
means for delivering exhaust gases from said exhaust manifold to said chamber;
means for delivering slipstream air from said propeller to said chamber; and
means for cooling said chamber including at least one cooling aperture formed in said lower member providing communication between said chamber and a lower face of said lower hull member, each cooling aperture being inclined to the vertical from the chamber to the bottom of said lower hull member toward the bow of the hull.

16. The boat as set forth in claim 15, wherein said apertures are inclined from said chamber toward the aft end of the hull at an angle of from about 30 degrees to about 60 degrees.

17. The boat as set forth in claim 15, wherein said apertures are inclined from said chamber toward the aft end of the hull at an angle of about 45 degrees.

18. The boat as set forth in claim 15, further comprising a propeller shroud assembly coupled to the hull and circumferentially encircling said propeller, said propeller shroud having means for channelling air from the slipstream side of the propeller through a conduit, said conduit being connected to said chamber.

19. The boat as set forth in claim 18, wherein the fore end of said shroud assembly has a larger diameter than the aft end of said shroud assembly.

20. The boat as set forth in claim 15 further comprising heat transferring means comprising a hull section remote from the upper and lower hull members that provides a broad lengthwise-extending surface that is disposed to be in contact with water during motion of the boat.

21. The boat as set forth in claim 20, wherein said heat transferring means further comprises:
at least one tube connected in a heat exchanging relationship to said lengthwise-extending surface, said tube having a fluid inlet and a fluid outlet; and
a circulating water system, said circulating water system being in fluid communication with said exhaust manifold for absorbing heat therefrom, said circulating water system being in fluid communication with said tube.

22. The boat as set forth in claim 15, further comprising:
a plurality of lengthwise-extending spacer elements disposed between said upper and lower hull members, said spacer elements defining a plurality of channels, said means for supplying slipstream air to said chamber comprising at least one slipstream air supplying means for supplying slipstream air to at least two of said channels and at least one exhaust gas supplying means for supplying exhaust gases to at least two other of said channels.

23. The boat as set forth in claim 22, wherein said cooling means further comprises:

at least one cooling aperture formed in said lower member corresponding to each of said channels providing communication between each channel in said chamber and the lower face of said lower hull member such that each cooling aperture is inclined to the vertical from the chamber to the bottom of said lower hull member toward the bow of the hull.

24. The boat as set forth in claim 23, wherein each cooling aperture is inclined at an angle of from about 30 degrees to about 60 degrees.

25. The boat as set forth in claim 23, wherein each cooling aperture is inclined at an angle of about 45 degrees.

26. A boat comprising:
   a hull;
   an internal combustion engine mounted to said hull, said internal combustion engine having at least one exhaust manifold;
   a propeller rotatably coupled to an upper side of said hull and powered by said internal combustion engine for propelling said hull at speeds enabling said hull to hydroplane over the surface of the water;
   a propeller shroud coupled to said hull, said shroud generally surrounding said propeller and including means for capturing slipstream air from said propeller;
   means for expelling gases from said manifold and slipstream air from said propeller shroud along the lower surface of said hull and against the surface of the water, said gas and air expelling means having means for reducing exhaust gas pressure from said exhaust manifold when the boat is hydroplaning over the surface of the water.

27. The boat as set forth in claim 26, further comprising heat transferring means comprising a part of the hull remote from the upper and lower hull members that provide a broad lengthwise-extending surface that is disposed to be in contact with water during motion of the boat.

28. The boat as set forth in claim 27, wherein said heat transferring means further comprises:

at least one tube connected in a heat exchanging relationship to said lengthwise-extending surface, said tube having a fluid inlet and a fluid outlet; and
a water circulating system in fluid communication with said exhaust manifold for absorbing heat therefrom, said water circulating system being in fluid communication with said tube.

29. The boat as set forth in claim 26, wherein said gas expelling means comprises:
   upper and lower hull members that are spaced apart from each other, means uniting said hull members at their fore and aft ends and along their lengthwise sides, to form a double hull defining a chamber there between;
   said lower hull member being formed with a plurality of apertures that provide communication between said chamber and the lower face of said lower hull member; and
   means for supplying gases to said chamber.

30. The boat as set forth in claim 29, wherein said apertures are inclined from said chamber to the aft end of the hull at an angle of from about 30 degrees to about 60 degrees from an axis extending transversely from the hull.

31. The boat as set forth in claim 30, wherein said apertures are inclined at an angle of about 45 degrees.

32. The boat as set forth in claim 26, further comprising means for cooling said double bottom portion of the hull.

33. The boat as set forth in claim 32, wherein said cooling means provides at least one cooling aperture formed in said lower member providing communication between said chamber and the lower face of said lower hull member, wherein each cooling aperture is inclined to the vertical from the chamber to the bottom of said lower hull member toward the bow of the hull.

34. The boat as set forth in claim 33, wherein each cooling aperture is inclined at an angle of from about 30 degrees to about 60 degrees.

35. The boat as set forth in claim 33, wherein each cooling aperture is inclined at an angle of about 45 degrees.

* * * * *